(12) United States Patent
Vertenoeuil

(10) Patent No.: US 11,808,286 B2
(45) Date of Patent: Nov. 7, 2023

(54) JET PUMP FOR A TURBOMACHINE, COMPRISING BLADING FOR IMPARTING ROTATION TO ACTIVE FLUID

(71) Applicant: SAFRAN AIRCRAFT ENGINES, Paris (FR)

(72) Inventor: Philippe Vertenoeuil, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 492 days.

(21) Appl. No.: 16/095,559

(22) PCT Filed: Apr. 25, 2017

(86) PCT No.: PCT/FR2017/050978
§ 371 (c)(1),
(2) Date: Oct. 22, 2018

(87) PCT Pub. No.: WO2017/187082
PCT Pub. Date: Nov. 2, 2017

(65) Prior Publication Data
US 2019/0107125 A1    Apr. 11, 2019

(30) Foreign Application Priority Data
Apr. 27, 2016 (FR) ...................................... 16 53747

(51) Int. Cl.
*F04F 5/46* (2006.01)
*F02C 7/236* (2006.01)
(Continued)

(52) U.S. Cl.
CPC .............. *F04F 5/463* (2013.01); *F02C 7/236* (2013.01); *F02M 37/025* (2013.01); *F04F 5/10* (2013.01);
(Continued)

(58) Field of Classification Search
CPC .. F04F 5/463; F04F 5/464; F04F 5/461; F04F 5/44; F04F 5/10; F02M 37/025; F02C 7/236; Y02T 50/60; F05D 2260/601
See application file for complete search history.

(56) References Cited

U.S. PATENT DOCUMENTS 3,134,338 A * 5/1964 Dodge .................... F04F 5/466
417/194
4,522,141 A    6/1985 Aker
(Continued)

FOREIGN PATENT DOCUMENTS

CN    204233987 U    4/2015
DE    37 32 415 A1    4/1988
(Continued)

OTHER PUBLICATIONS

Raw Machine Translation of WO2015189628A1, Hoon et al., "Ejector Device and Method", Dec. 17, 2015.*
(Continued)

*Primary Examiner* — Charles G Freay
*Assistant Examiner* — Lilya Pekarskaya
(74) *Attorney, Agent, or Firm* — Oblon, McClelland, Maier & Neustadt, L.L.P.

(57) ABSTRACT

A jet pump for a system for supplying fluid to a turbomachine. The jet pump includes an active fluid inlet pipe including a tube delimiting the inlet pipe, and a passive fluid inlet pipe that is fluidically separated from the active fluid inlet pipe by the tube. The active fluid inlet pipe includes at least one twisted blade that is positioned within the tube and is configured to make the active fluid rotate with respect to the axis of the tube.

17 Claims, 3 Drawing Sheets

(51) Int. Cl.
  *F04F 5/10* (2006.01)
  *F02M 37/02* (2006.01)

(52) U.S. Cl.
  CPC ......... *F05D 2260/601* (2013.01); *Y02T 50/60* (2013.01)

(56) References Cited

U.S. PATENT DOCUMENTS

| | | | | |
|---|---|---|---|---|
| 4,834,132 | A * | 5/1989 | Sasaki | B60K 15/01 123/514 |
| 5,024,583 | A * | 6/1991 | Sasaki | F02M 37/025 417/194 |
| 5,082,426 | A * | 1/1992 | Sasaki | B60K 15/077 180/314 |
| 9,775,936 | B2 * | 10/2017 | Wu | A61M 60/178 |
| 11,274,680 | B2 * | 3/2022 | Short | F04F 5/04 |
| 2004/0111885 | A1 * | 6/2004 | Irmisch | B23P 15/02 29/889 |
| 2011/0005232 | A1 * | 1/2011 | Williams | F23C 7/004 60/748 |
| 2013/0036738 | A1 | 2/2013 | Pora | |
| 2014/0083121 | A1 * | 3/2014 | Chiappetta, Jr | F25B 41/00 62/115 |
| 2015/0285271 | A1 | 10/2015 | Beg et al. | |

FOREIGN PATENT DOCUMENTS

| | | | |
|---|---|---|---|
| FR | 2 646 213 | 10/1990 | |
| GB | 575024 | 1/1946 | |
| WO | WO 83/04232 | 12/1983 | |
| WO | WO 2011/135240 A1 | 11/2011 | |
| WO | WO 2013/002872 A2 | 1/2013 | |
| WO | WO-2015189628 A1 * | 12/2015 | ............... F04F 5/46 |

OTHER PUBLICATIONS

International Search Report dated Aug. 9, 2017 in PCT/FR2017/050978 filed Apr. 25, 2017
U.S. Appl. No. 15/316,057, filed Dec. 2, 2016, US 2017-0101935 A1, Bellal Waissi, et al.
U.S. Appl. No. 15/304,212, filed Oct. 14, 2016, US 2017-0044986 A1, Philippe Vertenoeuil, et al.
U.S. Pat. No. 9,752,575, filed Sep. 5, 2017, Philippe Vertenoeuil.

* cited by examiner

JET PUMP FOR A TURBOMACHINE, COMPRISING BLADING FOR IMPARTING ROTATION TO ACTIVE FLUID

TECHNICAL FIELD

The invention relates to aircraft turbomachines such as turbojet engines and turboprop engines. More precisely, it relates to fluid, in particular fuel, supply systems for a turbomachine.

STATE OF PRIOR ART

Some fluid supply systems for a turbomachine, such as that disclosed in the international application WO 2011/135240 filed by the Company Snecma, comprise a jet pump.

A jet pump comprises an active fluid inlet conduit, a passive fluid conduit separated from the active fluid inlet conduit by a wall, a mixer in which the active fluid and the passive fluid are mixed to drive the passive fluid, as well as a diffuser for homogenising the fluid mixture rate at the outlet of the pump.

Jet pumps have the advantage of containing no movable part which makes them more reliable and tend to decrease their mass.

However, the efficiency of jet pumps in supply systems requires to be further improved. There is also a need for making the efficiency less dependent on the temperature and the operating point of the jet pump.

DISCLOSURE OF THE INVENTION

The invention aims at solving at least partially the problems encountered in the solutions of prior art.

In this regard, the object of the invention is a jet pump for a fluid supply system of a turbomachine.

The jet pump comprises an active fluid inlet conduit comprising a tube which delimits the active fluid inlet conduit, and a passive fluid inlet conduit fluidly separated from the active fluid inlet conduit by the tube.

According to the invention, the active fluid inlet conduit comprises at least two twisted vanes located inside the tube and configured to rotatably drive the active fluid with respect to the longitudinal axis of the tube, each of the vanes comprising a wall element which includes an inner side edge and an outer side edge opposite to the inner side edge, the vanes being connected to each other at their inner side edge which is substantially parallel to the longitudinal axis of the tube and which extends in the centre of the internal tube.

The vanes of a pump according to the invention are thus configured to rotatably drive the active fluid with respect to the axis of the tube, before being mixed with the passive fluid, which promotes mixing of the active fluid and the passive fluid.

Using the rotation of the active fluid, the vorticity and overall turbulence in the mixing zone of the active and passive fluids is increased. The yield of the jet pump is increased, and the variation in the efficiency of the jet pump as a function of the temperature is reduced.

The active fluid is for example air, oil or fuel. On the other hand, the active fluid has preferably the same composition as the passive fluid.

The invention can optionally include one or more of the following characteristics combined with each other or not.

Advantageously, at least one part of the trailing edge of at least one of the vanes comprises a substantially planar external surface, preferably substantially orthogonal to the axis of the tube. This substantially planar part promotes creating turbulences in the fluid.

Advantageously, at least one inner portion of the trailing edge of at least one of the vanes comprises a NACA type aerodynamic portion. This profile is useful for decreasing losses in the fluid by fluid friction and recirculations at the trailing edge of the vane.

According to one feature, at least one part of the leading edge of at least one of the vanes comprises a NACA type aerodynamic profile, to reduce losses by fluid friction and recirculations at the leading edge of the vane.

According to one feature, the leading edge of at least one of the vanes is tilted by a leading angle between 5° and 30° with respect to a transverse cross-section of the tube at the inlet of the tube.

According to one feature, the vane extends, along the direction of the axis of the tube, over a length higher than most of the length of the active fluid inlet conduit.

Preferably, the vane extends, along the direction of the longitudinal axis of the tube, over a length higher than two thirds of the length of the active fluid inlet conduit.

Preferably, the vane extends, along the direction of the axis of the tube, over a length substantially equal to the length of the active fluid inlet conduit.

According to an advantageous embodiment, the jet pump comprises at least three vanes, arranged about the axis of the tube and each located inside the tube, each vane being configured to rotatably drive the active fluid with respect to the axis of the tube.

According to one advantageous embodiment, the vanes are all twisted in a same direction.

According to one embodiment, each vane is twisted at a twisting angle between the opposite ends of the vane along the direction of the axis of the tube, the sum of the twisting angles being equal to 360°. In other words, the assembly formed by the vanes travels the entire circumferential tube length between both opposite ends of vane along the direction of the longitudinal axis of the tube.

The invention also relates to a fluid supply system for a turbomachine. The supply system comprises a jet pump as defined above, a high pressure displacement pump configured to be supplied with fluid by the jet pump, a fluid flow control system, and a fluid feedback loop.

The displacement pump is located between the jet pump and the flow control system. The fluid feedback loop has an inlet located downstream of the high pressure pump and an outlet configured to supply the active fluid inlet conduit of the jet pump with fluid. The fluid flow control system is configured to regulate a fluid flow rate in the feedback loop.

According to one advantageous embodiment, the supply system comprises a heat exchanger and/or a filter, downstream of the jet pump and between the jet pump and the flow control system.

According to one feature, the supply system comprises a low pressure centrifugal pump upstream of the jet pump, to supply the passive fluid inlet conduit of the jet pump with fluid.

The invention also relates to a turbomachine comprising a fluid supply system as defined above.

According to another advantageous embodiment, the turbomachine comprises a differential reducer configured to rotatably drive at least one propeller and for being supplied with lubricant by the supply system as defined above. The turbomachine is for example a turbomachine with a set of unshrouded contra-rotating propellers, also known as "Open Rotor".

BRIEF DESCRIPTION OF THE DRAWINGS

The present invention will be better understood upon reading the description of exemplary embodiments, given by way of purely indicating and in no way limiting purposes, making reference to the appended drawings in which.

DETAILED DISCLOSURE OF PARTICULAR EMBODIMENTS

Figure 1:
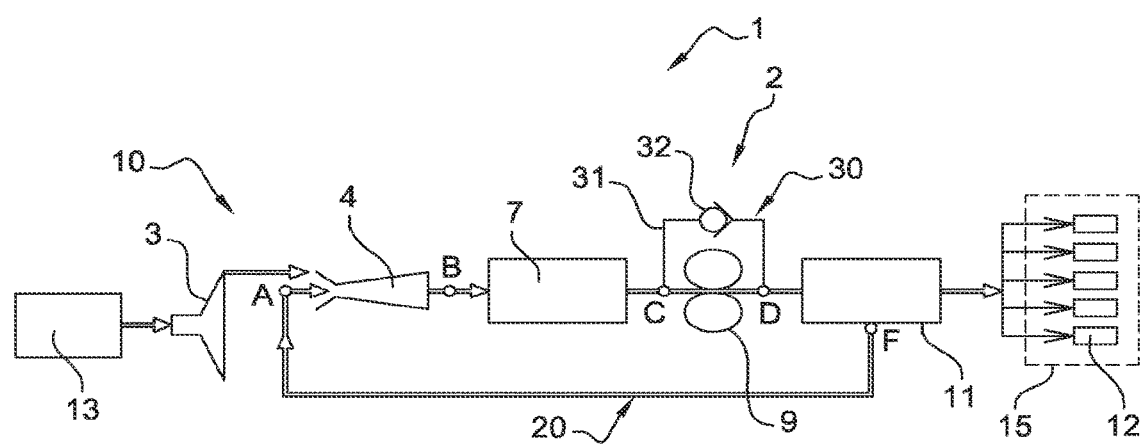
FIG. 1 is a partial schematic representation of a fluid supply system of a turbomachine, according to a first embodiment of the invention.

Identical, similar or equivalent parts of the different figures bear the same reference numerals so as to facilitate switching from one figure to the other.

FIG. 1 represents a fluid supply system 2 for an aircraft turbomachine 1. In the embodiment described, the fluid is fuel.

The supply system 2 comprises a main branch 10, a fuel recirculation loop 20 and a fuel feedback loop 30.

The main branch 10 comprises, from upstream to downstream, a low pressure centrifugal pump 3, a jet pump 4, a hydraulic resistance 7, a high pressure displacement pump 9, a fluid flow control system 11 and fuel injectors 12.

The terms "upstream" and "downstream" are defined in reference to the main fuel flow direction in the supply system 2 from a tank 13 towards the injectors 12.

The centrifugal pump 3 increases the pressure of fuel flowing from a fuel tank 13 to the jet pump 4. It supplies the active fluid inlet conduit 47 of the jet pump 4.

The jet pump will be described in more detail in reference to FIGS. 2 to 5. The jet pump 4 contains no movable part which makes it more reliable and tends to decrease its mass with respect to other types of pumps.

The centrifugal pump 3 and the jet pump 4 are for increasing the pressure of fuel which flows towards the displacement pump 9, so as to restrict/prevent the cavitation risks inside the displacement pump 9.

The hydraulic resistance 7 comprises an exchanger, a fuel filter, a cut-off valve and/or a flow rate meter. The term "hydraulic resistance" is used to define in this document, by analogy with the electricity field, the quantity from the ratio of the fluid pressure difference between inlet and outlet of an element of the supply system to the fluid flow rate passing through the element. By metonymy and still by analogy with the electricity field, the term "hydraulic resistance" is also used to designate an element of the supply system characterised by this quantity.

The displacement pump 9 delivers a constant fuel flow rate as a function of the engine rotation speed. In the embodiment described, the high pressure pump 9 is a displacement gear pump rotatably mechanically driven by a transmission box of the turbomachine 1.

The fuel flow control system 11 is configured to regulate the fuel flow rate which flows towards the injectors 12 and the one which flows in the feedback loop 20 to upstream of the displacement pump 9.

The fuel injectors 12 are designed to inject pressurised fuel in a combustion chamber 15 of the turbomachine 1.

The recirculation loop 30 bypasses the displacement pump 9. It is connected to the main branch 10 at a node D located between the displacement pump 9 and the flow control system 11 and a node C which is located between the hydraulic resistance 7 and the displacement pump 9. The recirculation loop 30 comprises a conduit 31 and a check valve 32. It is configured to circulate excess fuel downstream of the displacement pump 9 from node D to node C.

The feedback loop 20 forms a loop with the main branch 10 to which it is connected to a node F and to a node A. The inlet node F of the feedback loop 20 is located between the displacement pump 9 and the injectors 12. The outlet node A of the feedback loop 20 is located between the centrifugal pump 13 and the outlet of the jet pump 4. Node A is for supplying an active fluid inlet conduit 5 of the jet pump 4 with fuel. The feedback loop 20 is thereby used for circulating fuel excess downstream of the displacement pump 9 from node F up to node A, and operating the jet pump 4.

Figure 2:
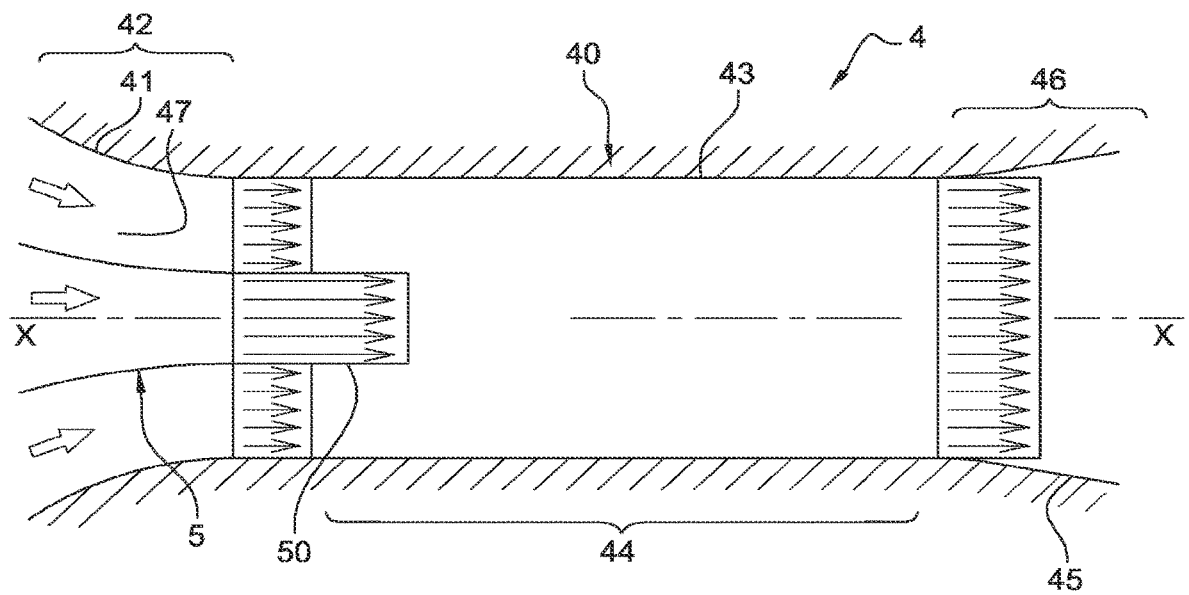
FIG. 2 is a longitudinal cross-section partial schematic representation of a jet pump of the supply system according to the first embodiment.
Figure 3:
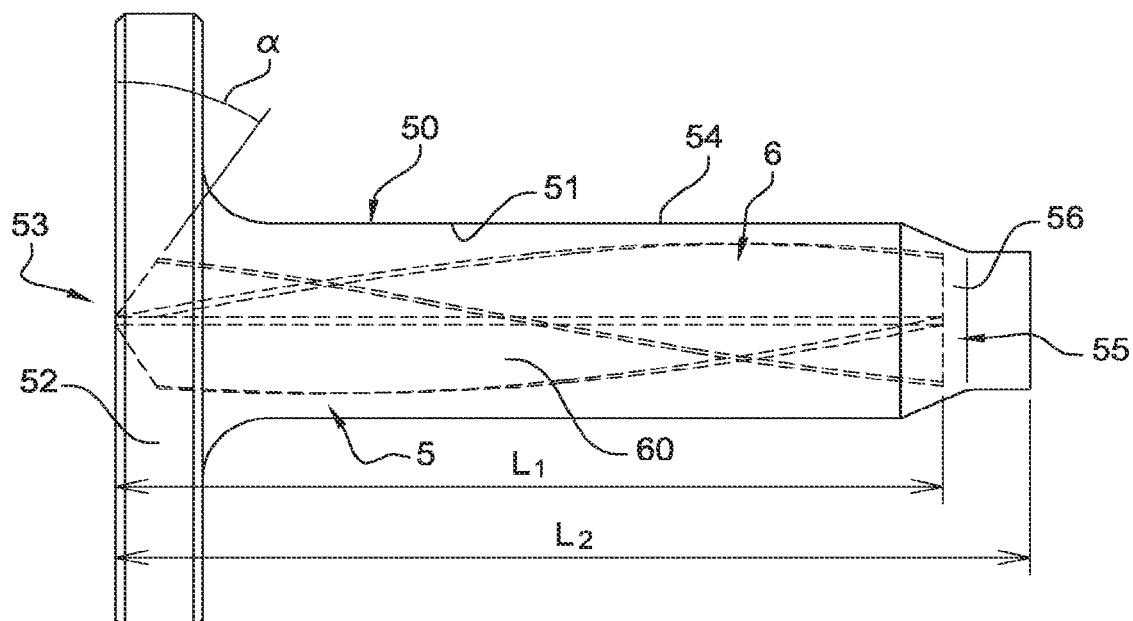
FIG. 3 is a side view representation of the active fluid conduit of the jet pump of the supply system.
Figure 4:
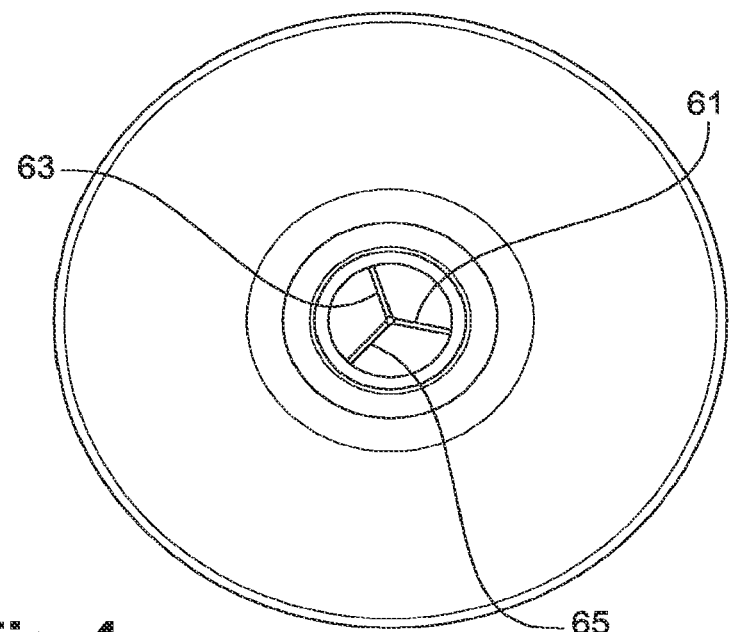
FIG. 4 is a front view schematic representation of the outlet of the active fluid conduit of the jet pump.

The jet pump 4 is described in reference to FIGS. 2 to 4. The jet pump 4 comprises an inlet 42, a mixer 44 and a diffuser 46 which is at the outlet of the jet pump.

In reference to FIG. 2, the jet pump 4 is delimited by an external tube 40 and it comprises an internal tube 50. This external tube 40 comprises a convergent portion 41 at the inlet 42 of the pump, a cylindrical intermediate portion 43 at the mixer 44, and a divergent portion 45 at the diffuser 46.

The jet pump 4 is substantially rotationally symmetric about its longitudinal axis X-X which corresponds to the upstream-downstream direction of the supply system 2. The longitudinal axis X-X corresponds to the direction of the longitudinal axis of the external tube 40 and to that of the direction of the longitudinal axis of the internal tube 50.

In the following of the disclosure, an axial direction refers to a direction parallel to the axis X-X of the internal tube 50 and a radial direction refers to a direction substantially orthogonal to the axis X-X of the internal tube 50.

The inlet 42 of the jet pump includes the active fluid inlet conduit 5 and the passive fluid inlet conduit 47 which is located about the active fluid inlet conduit 5.

The active fluid and passive fluid are both fuel circulating in the supply system 2. The active fluid, which comes from node A of the feedback loop 20, has a pressure and/or a rate higher than the passive fluid which directly comes from the centrifugal pump 3.

The mixer 44 is configured to mix the active fluid and the passive fluid so as to drive the passive fluid.

The diffuser 46 is for homogenising the fluid mixture rate at the outlet of the jet pump 4 and towards the displacement pump 9.

In reference to FIGS. 3 and 4, the active fluid conduit 5 comprises a securing disk 52, the internal tube 50 which is rigidly integral with the securing disk 52, and a device 6 for rotating the active fluid which is located inside the internal tube 50. In the embodiment represented, the active fluid inlet conduit 5 is made as a single piece.

The active fluid inlet conduit 5 is attached at the disk 52 to the external tube 40.

The internal tube 50 is delimited by a wall 51 which extends axially from the inlet 53 of the tube to the outlet 55 of the tube. The inlet 53 of the tube opens on outside the active fluid conduit 5 at the disk 52. The outlet 55 of the tube opens into the mixer 44.

The tube 50 includes a cylindrical part 54 and a convergent part 56 located downstream of the cylindrical part 54. The convergent part 56 is for increasing the active fluid rate, before the active fluid flows in the mixer 44.

The length of the cylindrical part 54 represents most of the length of the internal tube 50. In the embodiment represented, the length of the internal tube 50 is substantially equal to that of the active fluid conduit 5.

Figure 5:
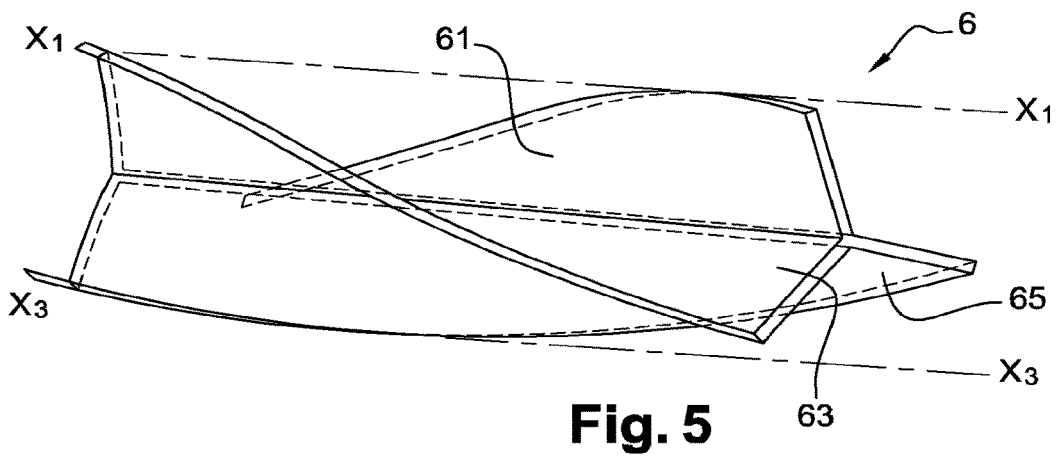
FIG. 5 is an elevation partial schematic representation of a device for rotating a fluid of the active fluid conduit.
Figure 6:
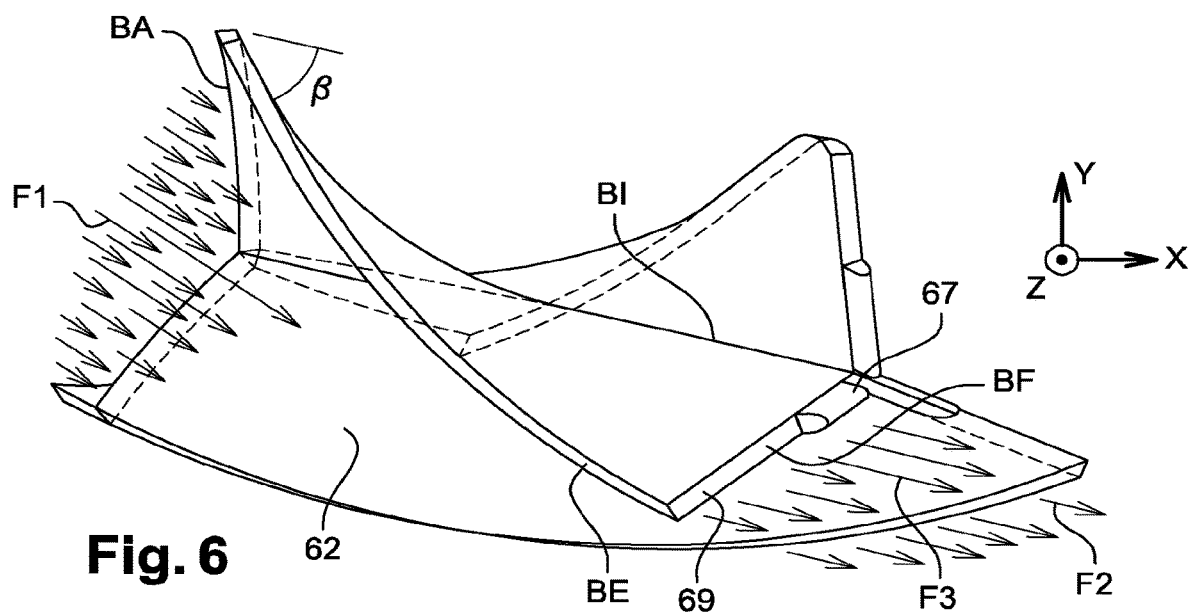
FIG. 6 is an elevation partial schematic representation of the rotating device upon flowing an active fluid.

In reference to FIGS. 3, 5 and 6 together, the device for rotating the active fluid 6 includes three twisted vanes 60 which are of a substantially identical structure. The device 6 for rotating the fluid is made as a single piece.

The vanes 60 are arranged about the longitudinal axis X-X of the jet pump 4. They are evenly distributed along the circumferential direction of the internal tube 50.

Each vane 60 has a length $L_1$ along the axial direction which is substantially equal to the length of the internal tube 50. The length $L_1$ of each vane 60 along the axial direction is higher than most of the length $L_2$ of the active fluid conduit 5.

Each vane 60 has a mean thickness which is between 5% and 10% of the internal diameter of the tube 50.

Each vane 60 comprises a wall element 62. The wall element 62 is delimited by an inner side edge BI, an outer side edge BE opposite to the inner side edge BI, a leading edge BA and a trailing edge BF opposite to the leading edge BA.

The inner side edge BI and the outer side edge BF of each vane 60 are radially opposite to each other. The leading edge BA and the trailing edge BF of each vane 60 are axially opposite to each other, delimiting the side ends of the vane 60. The inner side edge BI and the outer side edge BE each connect between the leading edge BA and the trailing edge BF.

The wall elements 62 of the vanes are all twisted in a same direction. The wall element 62 of the first vane 61 is twisted about a longitudinal axis $X_1$-$X_1$ of this vane 61 which is substantially parallel to the axis X-X of the tube. Likewise, the wall element 62 of the second vane 63 is twisted about a longitudinal axis of this vane 63 which is substantially parallel to the axis X-X of the tube. The wall element 62 of the third vane 65 is also twisted about a longitudinal axis $X_3$-$X_3$ of this vane 65 which is substantially parallel to the axis X-X of the tube.

Each vane 60 is twisted at a twisting angle β between its two opposite axial ends, such that the sum of the twisting angles β of the vanes is 360°. In other words, the device 6 for rotating the fluid travels the entire circumference of the tube 50 between the axial ends of the device 6 for rotating the fluid.

Even if the active fluid peels away from the walls of the vanes 60, the entire active fluid entering the internal tube 50 is thereby likely to be rotated by the rotating device 6.

In the embodiment represented, the twisting angles β of the vanes 60 are identical two by two.

The first vane 61, the second vane 62 and the third vane 63 are connected to each other at their inner side edge BI which is substantially parallel to the longitudinal axis X-X of the tube 50 and which extends in the centre of the internal tube 50.

The outer side edge BE of each vane 60 is rigidly fastened to the inner surface of the wall 51 of the internal tube 50.

The leading edge BA of each of the vanes 60 has a symmetric aerodynamic profile shape, in order to limit head losses of the active fluid. More precisely, the leading edge BA of each vane 60 has an aerodynamic profile similar to the airplane wings developed by the National Advisory Committee for Aeronautics, NACA. Such a profile is called a NACA type profile, in the present document.

The leading edge BA of each vane 60 is tilted by a leading angle α between 5° and 30° with respect to the transverse cross-section of the internal tube 50 at its inlet 53. The leading angle α enables vortices of the active fluid to be limited at the inlet of the internal tube 50.

The trailing edge BF of each vane 60 comprises along the radial direction of the vane 60 an inner portion 67 of trailing edge and an outer portion 69 of trailing edge. The trailing edge inner portion 67 has a symmetric aerodynamic profile shape, of the NACA type, in order to restrict the active fluid from peeling away from the wall element 62.

The trailing edge outer portion 69 has a substantially planar external surface which is substantially orthogonal to the side surface of the wall element 62. The substantially straight profile of the trailing edge outer portion 69 aims at creating vortices in this zone, so as to create Kevin Helmholtz type instabilities. These instabilities promote mixing the active fluid and passive fluid in the jet pump 4, and thus the efficiency of the jet pump 4.

The ratio of the length of the inner portion 67 to the total length of the trailing edge BF is between 50% and 80% of the length of the trailing edge.

The rotating device 6 is made by additive manufacturing, for example metal powder laser fusion, in order to make each vane 60 with a small thickness.

Figure 7:
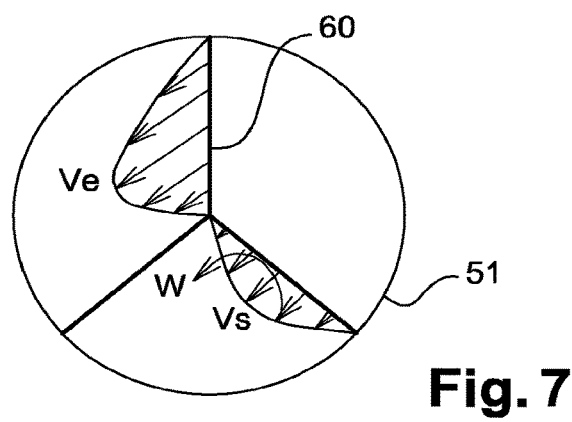
FIG. 7 is a planar representation of active fluid rate profiles at the inlet and outlet of the active fluid conduit.

The flow of the active fluid in the active fluid inlet conduit of the jet pump 4 is described in reference to FIGS. 6 and 7.

The active fluid flux F1 at the inlet of the internal tube 50 flows in this tube along a direction substantially parallel to the axis X-X of the tube and with an inlet rate $V_e$.

The passive flux is moved along a substantially axial direction about the internal tube 50 and inside the external tube 40.

In the internal tube 50, the active flux is spinned about the axis of the tube by the vanes 60, so as to leave the internal tube 50 according to a general flux F2 with a rate $V_s$ along the axial direction which is slightly lower than the inlet rate $V_e$, and with a rotation rate ω about the longitudinal axis X-X of the internal tube 50.

A part F3 of the active fluid flux at the outlet of the internal tube 50 opens from the rotating device 6 at the trailing edge outer portion 69. This active fluid flux F3 forms local vortices in this place, which generates Kevin-Helmholtz type instabilities which promote mixing the active fluid and the passive fluid in the mixer 44.

The active fluid flux F2, F3 which leaves the internal tube 50 and the passive fluid flux about the internal tube 50 then flow into the mixer 44 where they are mixed, such that the active fluid drives the passive fluid.

Finally, the fluid mixing rate is homogenised when this fluid mixture passes through the diffuser 46, towards the displacement pump 9.

The device 6 for rotating the active fluid enables the active fluid to be rotatably driven about the axis X-X of the internal tube with respect to the internal tube 50. As a result, there is a better mixing of the active fluid and passive fluid in the mixer 44 and an increase in the efficiency of the jet pump 4.

Of course, various modifications could be provided by those skilled in the art to the invention just described without departing from the scope of the disclosure of the invention.

Alternatively or in addition, the supply system 2 comprises a hydraulic resistance comprising an exchanger, a filter, a cut-off valve and/or a flow rate meter, between the displacement pump 9 and the flow control system 11.

Alternatively, the displacement pump 9 is an electric displacement pump, which enables the flow control system 11 regulating the fuel flow rate to the injectors 12 and the recirculation loop 20 to be removed. The displacement pump 9 is thereby controlled by the Full Authority Digital Engine Control (FADEC).

Alternatively, the active fluid conduit 5 is located about the passive fluid conduit 47.

On the other hand, the longitudinal axis of the internal tube 50 is likely to be tilted with respect to the longitudinal axis X-X of the jet pump 4.

Alternatively, the rotating device 6 comprises one, two vanes 60 or more than three vanes 60 connected to each other at their inner side edge BI.

The twisting angles β of the vanes 61, 63, 65 are likely to be distinct. On the other hand, it is possible that at least one of the vanes 61, 63, 65 is not twisted.

On the other hand, the vanes 60 are likely to be unevenly distributed about the axis X-X of the internal tube 50.

The invention claimed is:

1. A jet pump for a fluid supply system of a turbomachine, comprising:
    an inlet;
    a mixer; and
    a diffuser at an outlet of the jet pump,
    wherein the jet pump is delimited by an external tube extending along a longitudinal
    axis of the jet pump, the external tube including a convergent portion at the inlet, a cylindrical intermediate portion at the mixer, and a divergent portion at the diffuser,
    wherein the jet pump further comprises an internal tube disposed in and concentric with the external tube that is extending along the longitudinal axis, the internal tube extending along the longitudinal axis of the jet pump,
    wherein the inlet includes
    an active fluid inlet conduit comprising the internal tube extending along the longitudinal axis, the internal tube delimiting the active fluid inlet conduit, and a passive fluid inlet conduit, which is fluidly separated from the active fluid inlet conduit by the internal tube extending along the longitudinal axis,
    wherein the active fluid inlet conduit comprises twisted vanes which are located inside the internal tube, wherein the twisted vanes are configured to rotatably drive an active fluid with respect to the longitudinal axis of the jet pump,
    wherein each of the twisted vanes comprises a wall element which includes an inner side edge and an outer side edge, which is opposite to the inner side edge,
    wherein the inner side edge of each of the twisted vanes being directly connected to each other, the inner side edge of each of the twisted vanes being substantially parallel to the longitudinal axis of the jet pump and extending in a center of the internal tube,
    wherein a trailing edge of a first vane of the twisted vanes comprises, along a radial direction of the first vane, an inner portion of the trailing edge and an outer portion of the trailing edge,
    wherein the inner portion of the trailing edge comprises a NACA type aerodynamic profile, and
    wherein the outer portion of the trailing edge of the first vane comprises a substantially planar external surface which is substantially orthogonal to a side surface of the wall element, and
    wherein a ratio of a length of the inner portion of the trailing edge of the first vane to a total length of the trailing edge of the first vane is between 50% and 80% of the total length of the trailing edge of the first vane.

2. The jet pump according to claim 1, wherein at least one part of a trailing edge of at least one of the twisted vanes comprises a substantially planar external surface.

3. The jet pump according to claim 2, wherein the substantially planar external surface of the trailing edge of the at least one of the twisted vanes is substantially orthogonal to the longitudinal axis of the jet pump.

4. The jet pump according to claim 1, wherein at least one inner portion of a trailing edge of at least one of the twisted vanes comprises a NACA type aerodynamic profile.

5. The jet pump according to claim 1, wherein at least one part of a leading edge of at least one of the twisted vanes comprises a NACA type aerodynamic profile.

6. The jet pump according to claim 1, wherein a leading edge of at least one of the twisted vanes is tilted by a leading angle between 5° and 30° with respect to a transverse cross-section of the internal tube at an inlet of the internal tube extending along the longitudinal axis.

7. The jet pump according to claim 1, wherein each of the twisted vanes extends, along a direction of the longitudinal axis of the jet pump, over a length which is greater than most of a length of the active fluid inlet conduit.

8. The jet pump according to claim 7, wherein each of the twisted vanes extends, along the direction of the longitudinal axis of the jet pump, over the length which is greater than two thirds of the length of the active fluid inlet conduit.

9. The jet pump according to claim 1, comprising at least three twisted vanes which are arranged about the longitudinal axis of the jet pump, wherein the at least three twisted vanes are each located inside the internal tube extending along the longitudinal axis, and wherein the at least three twisted vanes are configured to rotatably drive the active fluid with respect to the longitudinal axis of the jet pump.

10. The jet pump according to claim 9, wherein the at least three twisted vanes are all twisted in a same direction.

11. The jet pump according to claim 10, wherein each of the at least three twisted vanes is twisted at a twisting angle between both opposite ends of each of the at least three twisted vanes along a direction of the longitudinal axis of the jet pump, wherein a sum of the twisting angles of the at least three twisted vanes is equal to 360°.

12. The fluid supply system for the turbomachine, comprising:
    the jet pump according to claim 1,
    a high pressure displacement pump configured to be supplied with the fluid by the jet pump,
    a fluid flow control system, wherein the high pressure displacement pump is located between the jet pump and the fluid flow control system, and
    a fluid feedback loop, which has an inlet located downstream of the high pressure displacement pump and an outlet configured to supply the active fluid inlet conduit of the jet pump with the fluid,
    wherein the fluid flow control system is configured to regulate a fluid flow rate in the fluid feedback loop.

13. The fluid supply system for the turbomachine according to the claim 12, further comprising at least one of a heat exchanger or a filter, disposed downstream of the jet pump or between the jet pump and the flow control system.

14. The fluid supply system for the turbomachine according to the claim 12, further comprising a low pressure centrifugal pump disposed upstream of the jet pump to supply the passive fluid inlet conduit of the jet pump that is fluidly separated from the active fluid inlet conduit with the fluid.

15. The jet pump according to claim 1, wherein the active fluid inlet conduit comprises a securing disk which is rigidly integral with the internal tube extending along the longitudinal axis, the active fluid inlet conduit being attached at the securing disk to the external tube that is extending along the longitudinal axis.

16. The jet pump according to claim 15, wherein the internal tube extending along the longitudinal axis is delimited by a wall, which extends axially from an inlet of the internal tube to an outlet of the internal tube, the inlet of the internal tube opening outside the active fluid inlet conduit at the securing disk, and the outlet of the internal tube opening into the mixer.

17. The jet pump according to claim 1, wherein the twisted vanes are made as a single piece.

* * * * *